Jan. 30, 1934. B. BEARDSLEY 1,945,475
CONVEYER TRANSFER MECHANISM
Filed Dec. 2, 1930 2 Sheets-Sheet 2
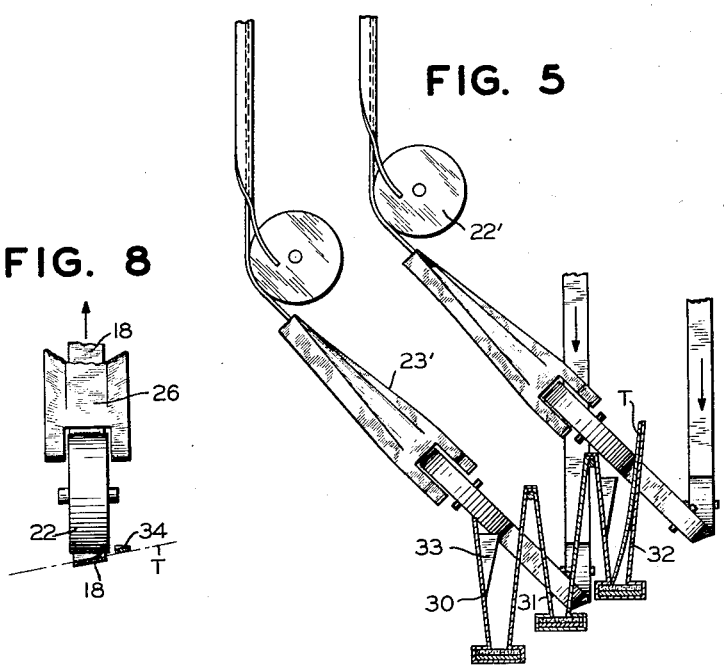
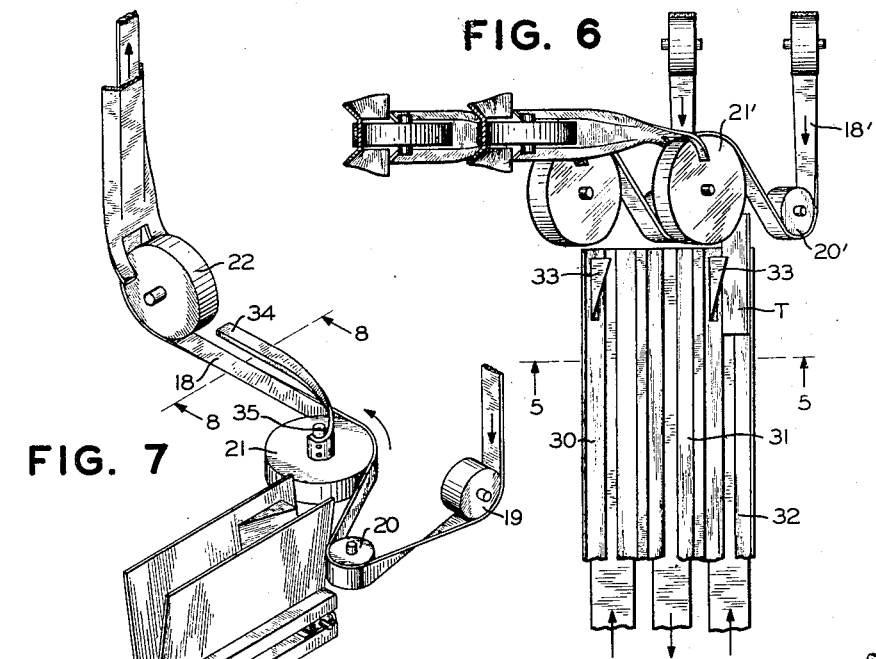
Inventor
B. BEARDSLEY Patented Jan. 30, 1934

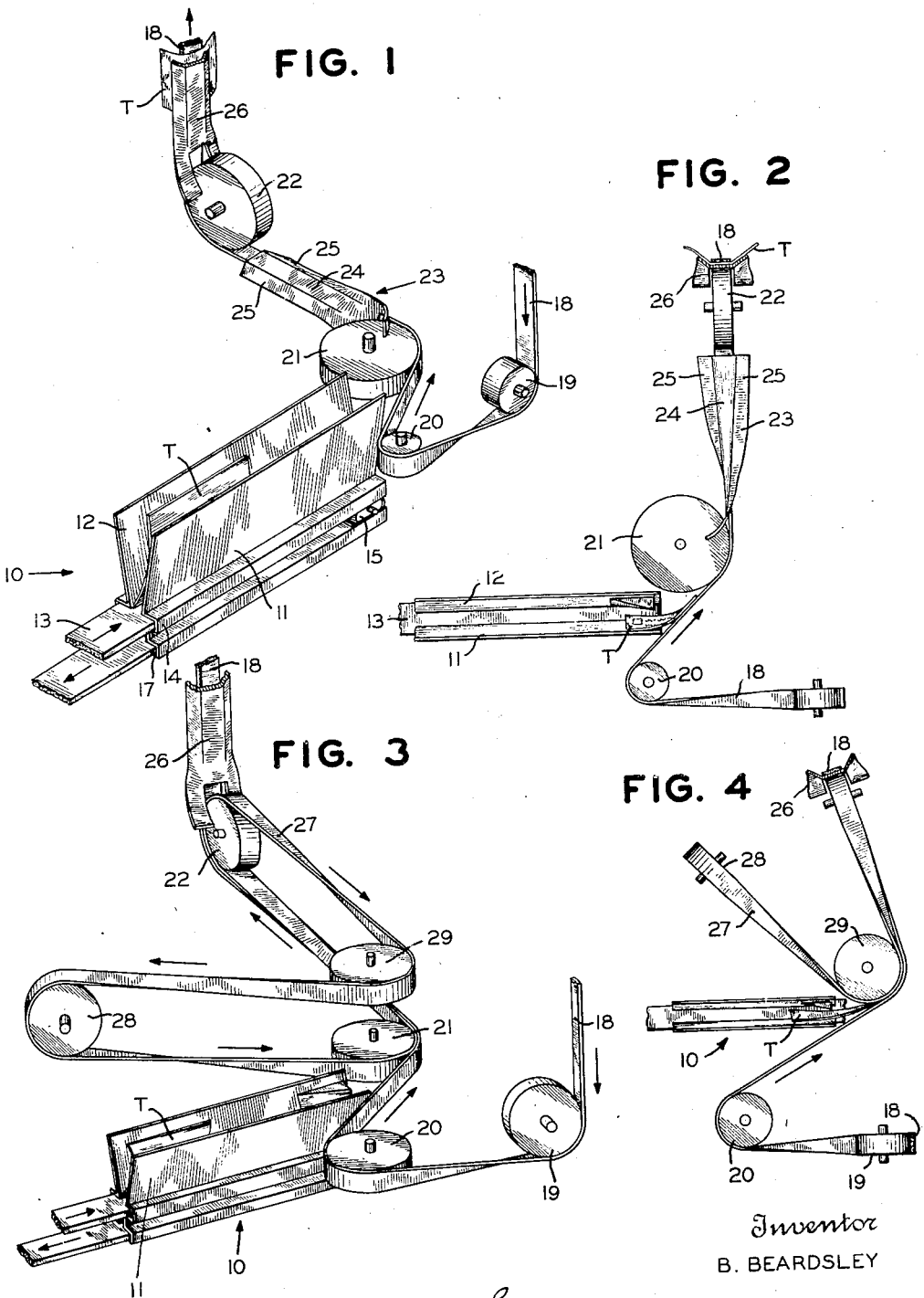

1,945,475

UNITED STATES PATENT OFFICE 1,945,475

CONVEYER TRANSFER MECHANISM

Bruce Beardsley, Brooklyn, N. Y., assignor to The Western Union Telegraph Company, New York, N. Y., a corporation of New York Application December 2, 1930. Serial No. 499,590

15 Claims. (Cl. 198—20)

This invention relates to a conveyer and more particularly to a mechanism for transferring sheet material, such as telegram forms, letters and the like, from a conveyer of the V-trough or vertical trough type into a conveyer of the drag or contacting strap type.

In the vertical trough type of conveyer, such as is shown in the copending application of d'Humy, Birkmeyer and Griffith, filed March 13, 1929, Serial No. 350,750, and entitled "Belt conveyers", the messages are transported along the conveyer in a substantially vertical or on edge position.

Briefly, such conveyers may comprise a substantially V-shaped open bottom trough having a rectangular conduit at the bottom thereof of greater width than the trough and extending under the edges thereof, through which a belt travels. The articles to be transported are disposed in the trough in a vertical position and are carried along the trough in such position.

It is convenient to employ a conveyer of this form to serve individual groups of telegraph operators, the conveyer being disposed adjacent the back of a row of operating tables as shown in Patent No. 1,780,118, granted October 28, 1930 to F. E. d'Humy. The telegram forms, as the messages are placed thereon by the receiving operators, are deposited in the trough and carried to the end of the row of operators, at which point they may be delivered into a high speed conveyer of the drag type or of the double strap type, which may extend upwardly to adjacent the ceiling and thence, by means of an overhead run, to a distant distributing center or other desired destination.

The drag conveyer consists briefly of a single narrow belt travelling in a stationary channel, the message forms being dragged along the channel beneath the belt by frictional engagement with the belt. A conveyer of this form is disclosed in a copending application of F. E. d'Humy et al., Serial No. 422,126, filed January 20, 1930, and entitled "Drag conveyer." In the double strap conveyer the telegram forms are conveyed between two contacting straps travelling in the same direction.

In the aforesaid d'Humy et al application, a transfer arrangement is disclosed in which the message forms, as they arrive at the end of the V-trough conveyer, are directed downwardly by a chute into the inlet of a drag conveyer or double strap conveyer system. While this arrangement has proven highly satisfactory and has gone into extensive use, there is a possibility of messages becoming lodged in the chute, particularly if they have been previously folded or rolled, as for conveyance in a pneumatic tube carrier. The chutes, moreover, take up considerable space at the end of the V-trough conveyer and where several parallel and closely spaced V-trough conveyers terminate adjacent the same point, as in the case of the distributing center described in application of Alexander Plausics, Serial No. 484,882, filed September 27, 1930, and entitled "Distributing center", a conjested condition occurs at the conveyer terminal.

One of the objects of the present invention is, therefore, to produce means for transferring articles being transported, from a vertical trough conveyer into a drag or double strap or similar type of conveyer, without the use of an intermediate chute or similar stationary guiding member.

Another object is to produce such a transfer arrangement which is simple, dependable and which may be confined to a relatively small space.

Other objects and advantages of the invention will appear hereinafter.

In accordance with the present invention the discharge end of the vertical trough conveyer is left open and the message forms projected from the open end, by the conveyer belt, into the junction of two moving elements, as a roller and a belt contacting therewith, which engage the message forms and carry them into the inlet of a drag or other type of conveyer system. The invention will be more fully understood by reference to the accompanying drawings in which:

Figure 1 is a perspective view showing the discharge end of a V-trough conveyer and the inlet end of a drag conveyer, of one arrangement embodying this invention;

Figure 2 is a plan view thereof;

Figure 3 is a perspective view showing the discharge from a V-trough conveyer into a double strap conveyer, and thence into a drag conveyer;

Figure 4 is a plan view of the arrangement shown in Figure 3;

Figure 5 is a vertical sectional view, on the line 5—5 of Figure 6, showing a modified arrangement adapted for use where two or more parallel V-trough conveyers terminate adjacent the same point;

Figure 6 is a plan view of the construction shown in Figure 5;

Figure 7 is a further modification; and,

Figure 8 is a sectional view on the line 8—8 of Figure 7.

Referring first to Figures 1 and 2, the discharge terminal of a V-trough conveyer 10 is shown, the conveyer comprising two diverging sides 11 and 12 in which the message blanks T are conveyed in a substantially vertical position by means of the endless belt 13. The main run of the belt travels in a rectangular housing 14, disposed at the base of the trough, the belt passing around a roller 15 at the end of the trough section, and returning in a second rectangular housing 17. The end of the trough is open, above the roller 15 and disposed adjacent this open end is the inlet of a drag conveyer system.

The drag conveyer system comprises an endless belt 18 passing around a vertical pulley 19, horizontal pulleys 20 and 21 and a vertical pulley 22, the belt being twisted between the rollers 19 and 20 and between the rollers 21 and 22, as shown. The roller 21 is disposed beyond the open end of the trough and the roller 20 is positioned in advance of the open end so that the section of the belt between these rollers travels obliquely across the open end of the V-trough.

The messages being conveyed along the trough are propelled by the belt 13 from the V-trough into contact with the belt 18 and thence into the junction of the belt and the roller 21. The telegram blanks are thus gripped between the belt and roller, carried around the roller and delivered into the trough section 23 against which the belt travels in frictional contact.

The trough section comprises an intermediate base portion 24 and outwardly diverging flanges 25. It is twisted to conform to the shape of the belt between the rollers 21 and 22 and the base portion is cut away adjacent the roller 21, the flanges being curved around each side of the roller so as to direct messages, carried vertically around the roller, in between the trough and the belt. The messages are dragged along the trough by the moving belt and thence around the roller 22 and into a second drag conveyer section 26 by which they may be conveyed vertically or in any other desired direction, to their destination.

In Figure 3 the V-trough conveyer 11 discharges into a double strap conveyer which consists of an endless belt 27 passing around the rollers 21, 22, 29 and 28 in succession, the belt being twisted from the horizontal to the vertical position between rollers 22 and 29 and between rollers 28 and 21 and back to the horizontal between the rollers 29 and 28 and between rollers 21 and 22. The belt 18, which forms part of the drag conveyer, extends around the rollers 19 and 20 and thence around rollers 21 and 22, in contact with the belt 27. The portion of the belt 18 between the rollers 20 and 21 passes obliquely across the open end of the V-trough and the messages, as they are propelled from the V-trough, engage between the belts 18 and 27 and are carried thereby to the inlet of the drag conveyer channel 26.

In Figures 5 and 6 a number of V-trough conveyers 30, 31 and 32 are shown terminating at the same point, two of the conveyers 30 and 32 discharging at the end of the conveyer illustrated and the intermediate conveyer 31 discharging at the opposite end of the V-trough conveyer system (not shown). This arrangement of V-trough conveyers is employed in the distributing center disclosed in the aforesaid application of Alexander Plausics. In these figures, each drag conveyer pick-up differs from that of Figure 1 in that the rollers 20' and 21' have their axis inclined to the vertical, so that the belt 18' travels upwardly and outwardly from the end of the V-trough, thus permitting a separate drag conveyer to be disposed opposite the outlet of each of the vertical trough conveyers 30 and 32 without either interfering with the other. A deflector 33 is disposed adjacent the end of each of the V-trough conveyers for deflecting the telegrams into the most favorable angle for being picked up by the belt 18' and the roller 21'. The inclined arrangement enables the rollers 22' to be disposed closer to the vertical plane extending longitudinally through the V-trough conveyer, than with the arrangement of Figure 1 thereby reducing the transverse space required for the pick-up mechanism.

In Figure 7 a further modification is shown in which the drag trough between the rollers 21 and 22 is dispensed with. In its place a single bar 34 is provided which may be mounted upon the stationary shaft 35 of the roller 21. The bar 34 extends outwardly from the roller 21 to adjacent the belt and is twisted so that its wider side is parallel to the belt between the rollers 21 and 22. The function of the rod 34 is to engage the messages as they pass vertically around the roller 21 and to deflect them into a horizontal position, so that they will readily pass between the belt and the roller 22. The relative position of the belt and the rod 34 is shown in Figure 8.

It is obvious, of course, that various other modifications of the invention will occur to those skilled in the art and, therefore, I do not desire to be limited to the specific arrangement and construction shown and described but contemplate all such changes as are embraced within the terms of the appended claims.

What I claim is:

1. In a conveyer system, a conveyer adapted to transport sheet material in a substantially vertical position and horizontal direction comprising a vertical trough having an open discharge end and a belt traveling in the base of said trough, a second conveyer having a belt passing obliquely across the open end of said trough, a movable element cooperating with said belt whereby sheet material discharged through the open end of said first conveyer by said first belt, will be propelled between said second belt and said movable element.

2. In a conveyer system, a conveyer adapted to transport sheet material in a substantially vertical position and horizontal direction comprising a vertical trough having an open discharge end and a conveyer element traveling in the base of said trough, a second conveyer having a belt passing obliquely across said open end, a roller disposed beyond the end of said trough around which said belt passes, whereby sheet material discharged through the open end of the trough will be engaged between said belt and roller.

3. In a conveyer system, a conveyer adapted to transport sheet material in a substantially vertical position and horizontal direction comprising a trough having an open discharge end and a conveyer element traveling in the base thereof, a second conveyer having a belt passing obliquely across said open end in an upwardly inclined direction, a movable element cooperating with said belt whereby sheet material discharged from said trough will be engaged between said belt and said movable element.

4. In a conveyer system, a conveyer adapted to transport sheet material in a substantially vertical position and horizontal direction comprising a V-shaped trough having an open discharge end and a belt traveling in the base thereof, a second conveyer disposed adjacent the terminal of the first conveyer and having a pair of converging movable elements, said first conveyer terminating between said movable elements and a deflector adjacent the open end of said trough for inclining said sheet material toward one of said converging elements whereby the lower portion of said sheet will be positioned in advance of the upper portion, in the direction of travel of said second conveyer.

5. In a conveyer system, a conveyer adapted to transport sheet material in a substantially vertical position and horizontal direction, comprising a substantially vertical trough having an open discharge end, a conveyer element adapted to travel in the base of said trough, a second conveyer having a belt and a member contacting therewith, between which said material may be carried, said belt having a component of motion in the direction of travel of said conveyer element and being positioned relative to the open end of said trough so that sheet material, as it is discharged from the trough, will engage the belt and be directed thereby between the belt and said contacting member.

6. In a conveyer system, a conveyer adapted to transport sheet material in a substantially vertical position and horizontal direction, comprising a trough having an open discharge end, a conveyer element arranged to travel in the base of the trough, a drag conveyer for receiving sheet material discharged from said trough, said conveyer having a belt and a stationary member contacting therewith between which said material is carried, said belt being arranged to extend beyond the end of the stationary member with the extended portion disposed adjacent the end of the trough, whereby sheet material discharged from the trough will engage the belt and be directed thereby into said drag conveyer.

7. In a conveyer system, a conveyer adapted to transport sheet material in a substantially vertical position and horizontal direction comprising a trough having an open discharge end, a conveyer element arranged to travel in the base of said trough, a second conveyer having a belt and a member contacting therewith between which said material may be carried, said second conveyer having an inlet disposed adjacent to the discharge of the first conveyer, a roller positioned at one side of said trough adjacent the open end, and around which said belt extends, said belt having a component of motion in the direction of travel of the sheet material in the trough and being positioned relative to the trough so that sheet material discharged from the open end of the trough will be directed through the junction of said belt and roller and into the inlet of said drag conveyer.

8. In a conveyer system, a conveyer adapted to transport sheet material in a substantially vertical position and horizontal direction, comprising a trough having an open discharge end, a conveyer element adapted to travel in the base of said trough, a roller positioned at one side of said trough adjacent the open end, a belt passing partially around said roller and having a component of motion in the direction of travel of sheet material in said trough, whereby the sheet material as it is discharged from the end of said trough will engage the belt and be directed thereby into the junction of said belt and roller, a drag channel, a second roller adjacent the end of said channel and disposed at an angle to said first roller, said belt passing from said first roller around said second roller and into said drag channel, and means for guiding said sheet material from said first roller into the junction of said belt and second roller.

9. A conveyer system comprising a group of parallel vertical trough conveyers disposed side by side and adapted to convey sheet material in a substantially vertical position and horizontal direction, individual conveyer elements adapted to travel in the base of each trough, each alternate conveyer discharging at one end of said group and the intermediate conveyers discharging at the opposite end of said group, the discharging end of each conveyer being open whereby said sheet material will be propelled from the end thereof in the direction of its travel through the conveyer and a receiving conveyer corresponding to each alternate trough, and disposed with its inlet adjacent the open end of the trough for receiving said sheet material as it is discharged from said trough conveyers, said receiving conveyer being inclined in a plane extending transversely of said trough, whereby all of the receiving conveyers may be disposed in parallel relation in the same plane.

10. A conveyer system comprising a group of parallel vertical trough conveyers disposed side by side and stepped upwardly from the foremost to the rearmost conveyer, said conveyers being adapted to convey sheet material in a substantially vertical position and horizontal direction, individual conveyer elements adapted to travel in the base of each trough, at least two of said conveyers discharging at one end of said group and being spaced apart by at least one intermediate conveyer discharging at the opposite end of said group, the discharge ends of said two conveyers being open whereby said sheet material will be propelled from the ends thereof in the direction of its travel through the conveyers and converging pick up members at the open end of each of said conveyers, for receiving said material as it is discharged from said trough conveyers, said pick up members being inclined upwardly and having a component motion in the direction of discharge of said material.

11. An conveyer system comprising a pair of spaced rollers disposed at an angle to each other, a belt passing around said rollers, said belt being twisted intermediate said rollers to conform to the angular relation thereof, means for introducing sheet material between said belt and first roller and a stationary guide member extending along said belt intermediate said rollers for causing said sheet material to conform to the twist of said belt and for directing it into the junction of said belt and second roller.

12. In a conveyer system, a conveyer adapted to transport sheet material in a substantially vertical position and horizontal direction and comprising a V-shaped trough having an open discharge end and a belt traveling in the base thereof, a second conveyer disposed adjacent to the terminal of the first conveyer and inclined in a plane located transversely of the open end of said trough, said second conveyer having a pair of movable elements converging along a line at right angles to the plane of inclination, said line being inclined with respect to the sides of said trough, said first conveyer terminating between said movable elements, and means adjacent to the open end of said trough for inclining the sheet material toward the converging line of said movable elements.

13. A conveyer system comprising a group of parallel vertical trough conveyers disposed in side by side relation and adapted to convey sheet material in a substantially vertical position and horizontal direction, individual conveyer elements adapted to travel in the base of each trough, each alternate conveyer discharging at one end of said group and the intermediate conveyers discharging at the opposite end of said group, the discharging end of the alternate conveyers being located in substantially the same transverse plane and being provided with an open end whereby said sheet material will be propelled from the end thereof in the direction of its travel through the conveyer, and a receiving conveyer corresponding to each alternate trough and disposed with its inlet adjacent the open end of the trough for receiving said sheet material as it is discharged therefrom, said receiving conveyers being inclined transversely of said trough, whereby all of said receiving conveyers may be disposed in a plane parallel to the plane including the discharge ends of said troughs.

14. In a conveyer system, a conveyer adapted to transport sheet material in a substantially vertical position and horizontal direction, said conveyer comprising a trough having an open discharge end, a conveyer element adapted to travel in the base of said trough and discharge the material from said end in the direction of its travel through the conveyer, a receiving conveyer having its inlet disposed adjacent to the discharge end of said trough for receiving material as it is discharged therefrom, said receiving conveyer being disposed in an inclined position in a plane transverse to the conveyer trough, whereby a plurality of said troughs and receiving conveyers may be arranged in parallel relation with their discharge ends disposed in substantially the same transverse plane.

15. In a conveyer system for sheet material, a first conveyer adapted to transport sheets in a substantially vertical position and horizontal direction comprising a trough with upstanding side walls and an open discharge end and means for carrying the sheets along the trough, a second conveyer disposed with its inlet adjacent to the discharge end of the first, the inlet of said second conveyer embodying a pair of sheet engaging members converging along a line inclined to the vertical, said first conveyer embodying means at the discharge end thereof for rotating the sheets from the vertical toward said inclined position as they emerge from said discharge end.

BRUCE BEARDSLEY.